United States Patent [19]

Henley

[11] 4,049,486
[45] Sept. 20, 1977

[54] RUBBER STRIP GUIDE APPARATUS

[75] Inventor: Virgil E. Henley, Akron, Ohio

[73] Assignee: The General Tire & Rubber Company, Akron, Ohio

[21] Appl. No.: 622,577

[22] Filed: Oct. 15, 1975

[51] Int. Cl.$^2$ .................. B29H 17/20; B29H 17/36
[52] U.S. Cl. ..................... 156/405 R; 156/128 R; 226/17
[58] Field of Search .............. 156/128 R, 130, 133, 156/405, 406; 226/15-19, 21, 189, 190, 192, 196, 198, 199

[56] References Cited

U.S. PATENT DOCUMENTS

| | | | |
|---|---|---|---|
| 2,346,439 | 4/1944 | Leguillon | 156/405 |
| 3,038,524 | 6/1962 | Bosomworth | 156/128 |
| 3,100,069 | 8/1963 | Richards et al. | 226/17 |
| 3,139,963 | 7/1964 | Nadler et al. | 156/405 |
| 3,407,106 | 10/1968 | Barefoot | 156/405 |
| 3,413,174 | 11/1968 | Porter | 156/405 |

Primary Examiner—Charles E. Van Horn
Assistant Examiner—John E. Kittle

[57] ABSTRACT

Apparatus suitable for guiding an uncured, deformable semiplastic rubber strip having skived or feathered outer thin edges, such as a tire tread strip or sidewall strip, into precise alignment with a tire carcass mounted on a drum of a tire building machine. Includes a plurality of support rollers linearly mounted for supporting the lower surface of a rubber strip with each support roller being axially movable and resiliently urged in the axial direction by springs mounted in compression at the ends of each support roller; a plurality of upper guide rollers and mounted above the support rollers and linearly offset from the support rollers. Each of the upper guide rollers is preferably canted upwardly and inwardly toward the center of the rubber strip and is mounted for rolling engagement with the top and edge of a thin edge of the rubber strip. Also, a plurality of lower guide rollers are mounted in linearly offset relation with the upper guide rollers and linearly offset with the support rollers. Each of the lower guide rollers is preferably canted downwardly and inwardly toward the center of the rubber strip and is mounted for rolling engagement with the bottom and edge of a thin edge of the rubber strip.

21 Claims, 8 Drawing Figures

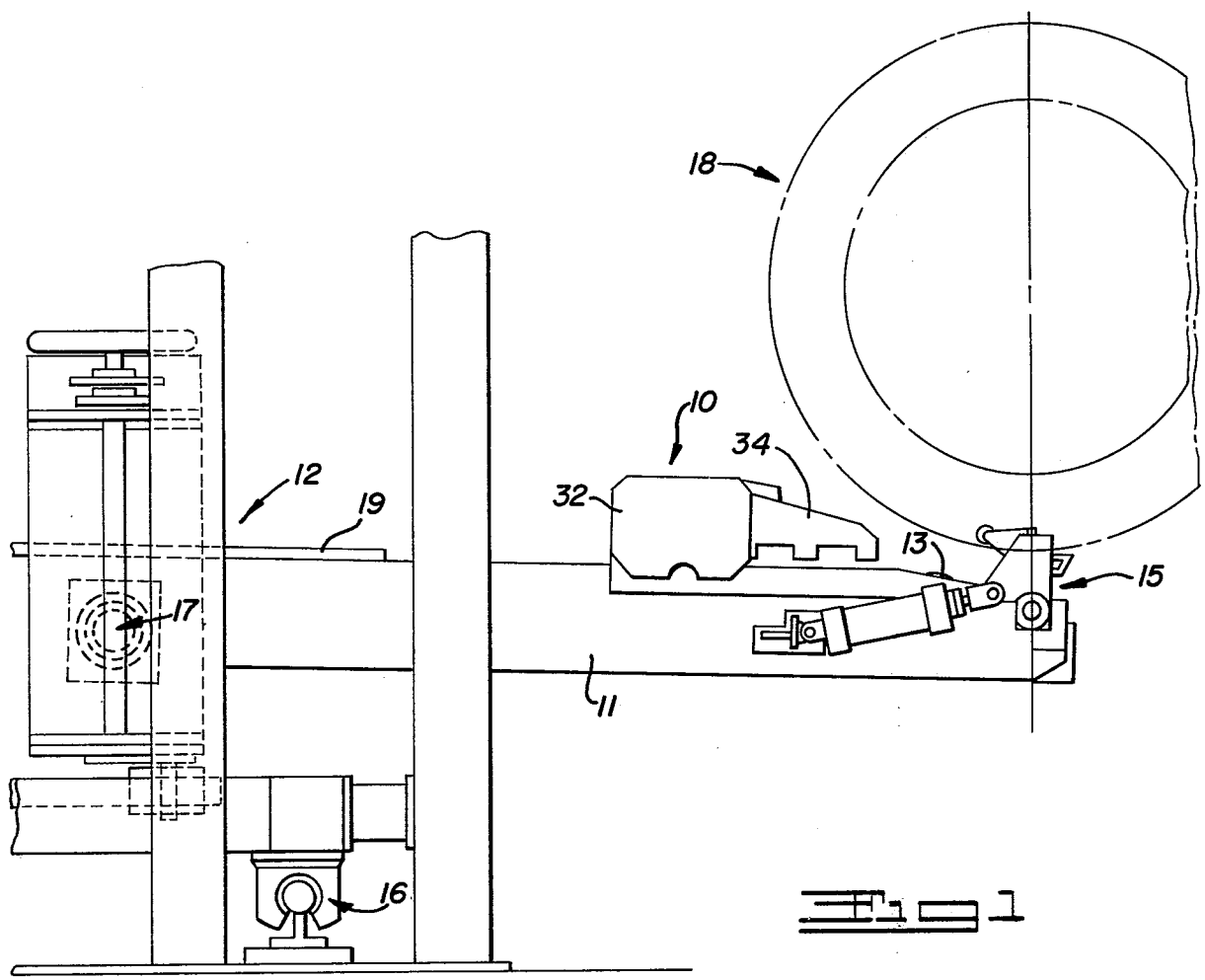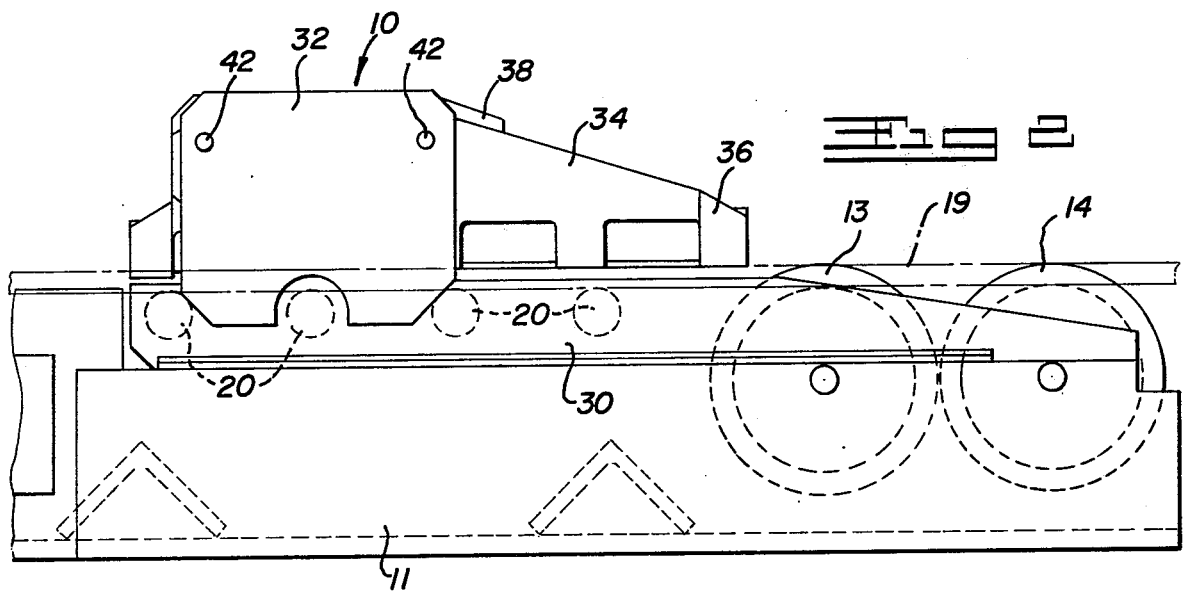

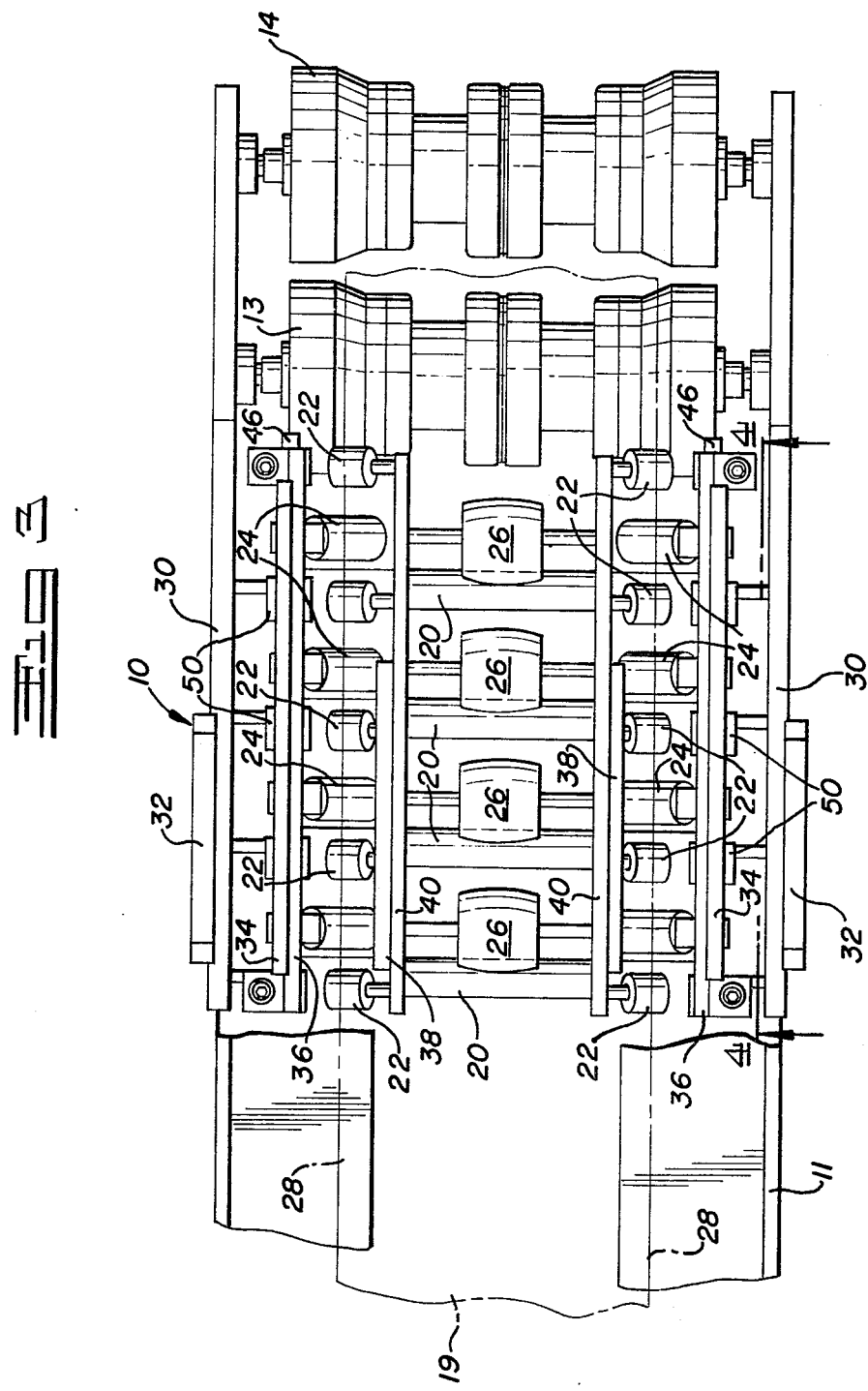

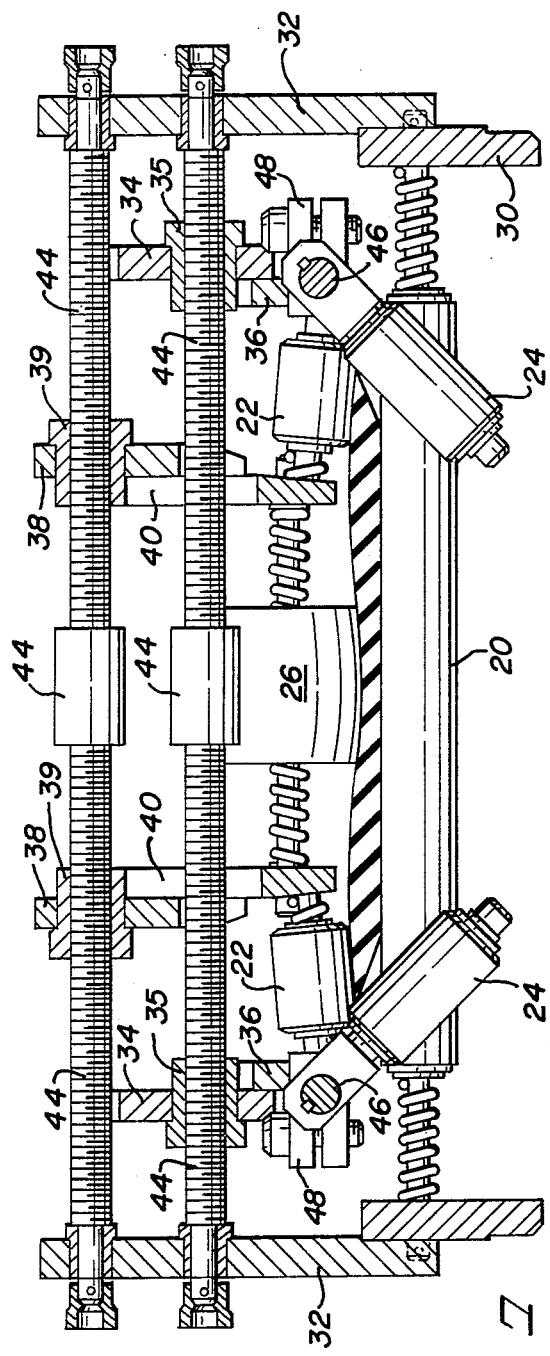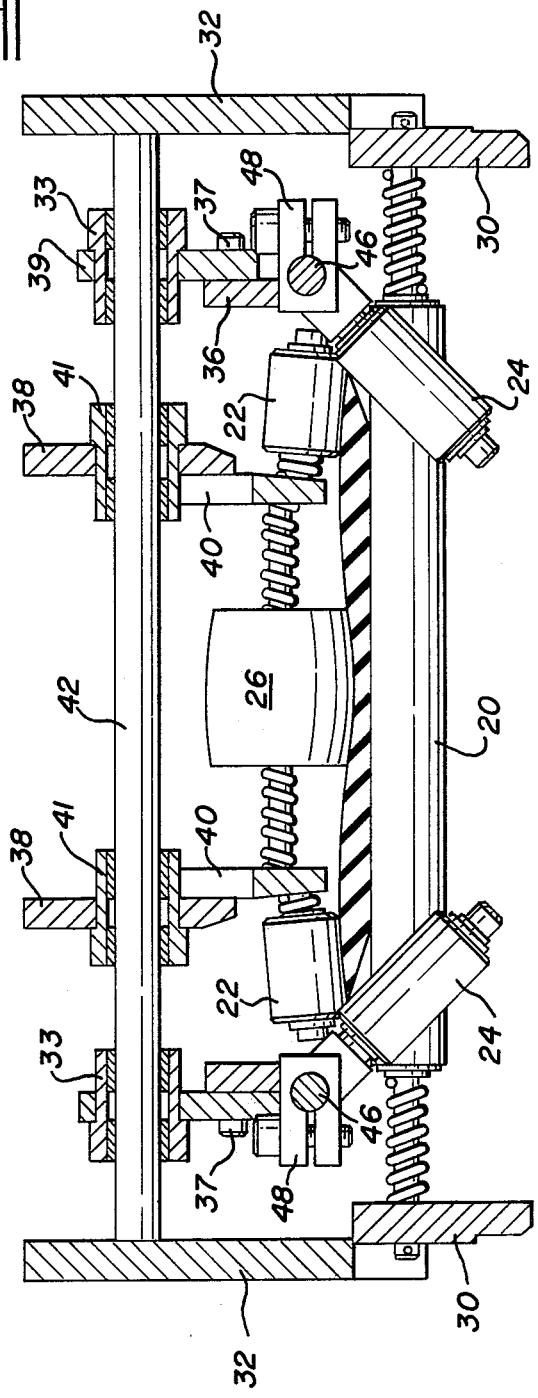

RUBBER STRIP GUIDE APPARATUS

FIELD OF THE INVENTION

The present invention pertains to guiding soft flexible strips and more particularly to apparatus for guiding an uncured, deformable semiplastic rubber strip member having skived or feathered edges, such as a tire tread strip or a tire sidewall strip, into precise alignment for application to a tire carcass mounted on a drum of a tire building machine.

In the building of tires, and particularly in the building of radial tires, different strips of contoured uncured rubber are separately applied to the carcass of a tire being built up in a tire building machine such as disclosed in U.S. Pat. No. 3,475,254 to Henley, for example. Such rubber strips have skived or feathered edges which overlap to some extent to produce a green tire which is molded and cured into an ultimately uniform finished tire. Such strips need to be guided into applied position with precision and the thin skived edges of each strip presents a guiding problem when such edges must be used by a guiding mechanism to correctly position the strip.

Prior examples of rubber strip guiding apparatus are shown in U.S. Pat. No. 3,139,963 to Nalder et al, U.S. Pat. No. 3,407,106 to Barefoot and U.S. Pat. No. 3,413,174 to Porter.

The present invention in a somewhat varied embodiment is shortly outlined in commonly assigned and copending U.S. patent application to Henley and Brown Ser. No. 565,036, filed Apr. 4, 1975, for "Side Wall Applicator" as a component element of the appratus therein disclosed.

The embodiment of the invention herein disclosed may be utilized as a tread strip applicator component in the tire servicing apparatus generally disclosed in commonly assigned and copending U.S. application to Henley and Brown, Ser. No. 585,263, filed June 9, 1975, for "Method and Apparatus For Applying Belt Strips To A Tire Carcass."

The tire servicing apparatus generally disclosed in this application and in the above referenced pending patent applications have been developed for utilization with tire building apparatus such as disclosed in the above identified U.S. Pat. No. 3,475,254 to Henley.

SUMMARY OF THE INVENTION

The present invention provides means to guide, through corrective positioning, deformable uncured rubber strips having skived or feathered edges and having both constant and varied thickness profiles, into a precise position for application onto a drum of a tire building machine.

The present invention also provides means to correctly position and guide deformable uncured rubber strips having skived or feathered thin edges into precise feeding position into a tire building machine by transverse or lateral positioning of such strips through guidance of such thin edges.

The foregoing and other provisions of the present invention are provided in apparatus suitable for guiding an uncured, deformable semiplastic rubber strip having skived or feathered thin edges, such as a tire tread strip or sidewall strip, into precise alignment for application to a tire carcass mounted on a drum of a tire building machine. The apparatus includes a plurality of support rollers mounted in axially spaced apart and parallel relation for supporting the lower surface of said rubber strip with each support roller being axially movable and resiliently held in the axial direction by springs mounted in compression at the ends of each support roller. Also included are a plurality of upper guide rollers mounted in axially spaced apart relation above said support rollers and linearly offset from said support rollers. These upper guide rollers are preferably canted upwardly and inwardly toward the center of the rubber strip and are mounted for rolling engagement with the top and edge of a thin edge of the rubber strip so as to push the thin edge downwardly and inwardly. Further included are a plurality of lower guide rollers mounted in axially aligned, axially spaced apart relation linearly offset from the upper guide rollers and linearly offset from the support rollers. These lower guide rollers are preferably canted downwardly and inwardly toward the center of the rubber strip and mounted for rolling engagement with the bottom and edge of the thin edge of the rubber strip so as to push the thin edge upwardly and inwardly. The support rollers are adapted to move axially to accommodate any transverse movement of the rubber strip as a result of being guided by the lower guide rollers in alternate cooperation with the upper guide rollers. The upper guide rollers may be mounted with resilient springs allowing yieldable axial movement of the upper guide rollers toward the center of the rubber strip to accommodate transverse movement of the rubber strip. The lower guide rollers may be angularly adjustable with respect to said support rollers. The essentials of the combination are the support rollers, the upper guide rollers and the lower guide rollers disposed in axially spaced apart and linearly offset relation as above described. The present embodiment utilizes the upper guide rollers and the lower guide rollers in transversely opposed pairs as herein described. The lower guide rollers and the upper guide rollers respectively may be transversely adjustable together and apart to be capable of accommodating rubber strips of different widths. The upper guide rollers may be vertically adjustable to be capable of accommodating rubber strips of different thicknesses. A plurality of upper pressure rollers may be mounted in spaced apart and parallel relation with the support rollers near the center of the top of the rubber strip with each pressure roller being axially and vertically movable and resiliently held in the axial direction by springs mounted in compression at the ends of each pressure roller; each pressure roller is adapted to assist the guide rollers in aligning said rubber strip and in accommodating any transverse adjustments in position of the rubber strip as a result of being guided by the guide rollers.

DESCRIPTION OF THE DRAWINGS

FIG. 1 is a side elevation view of the guiding apparatus of the present invention as mounted for operation with a schematically shown tire building machine and a schematically shown servicing apparatus.

FIG. 2 is an enlarged side elevational view of the guiding apparatus of the present invention.

FIG. 3 is a partly schematic plan view of the guiding apparatus shown in FIG. 2.

FIG. 7 is a partly sectional view taken along the line 7—7 of FIG. 4.

FIG. 8 is a partly sectional view taken along the line 8—8 of FIG. 4.

DESCRIPTION OF A PREFERRED EMBODIMENT

Figure 4:
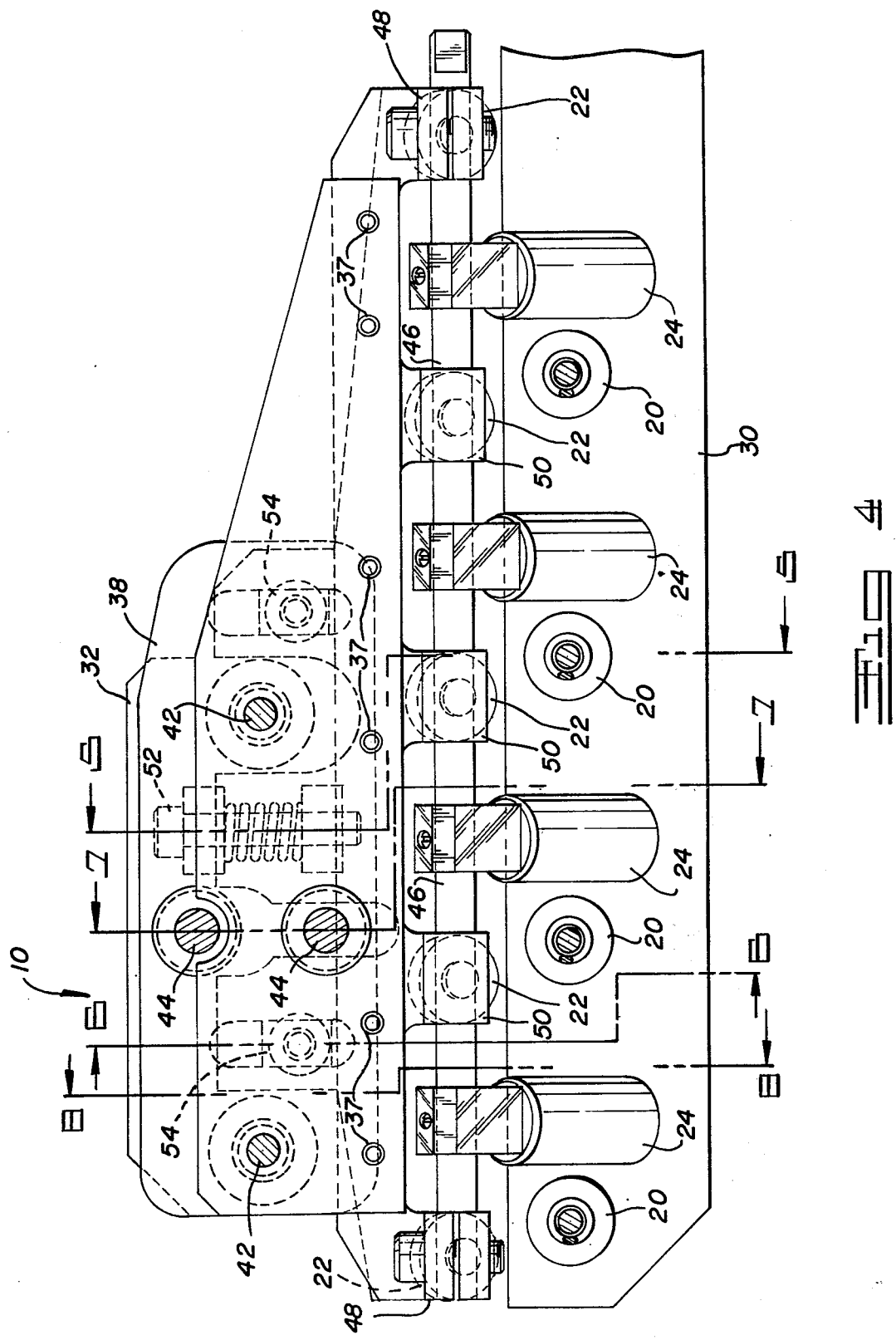
FIG. 4 is side elevational view taken along the line 4—4 of FIG. 3 showing the lines along which various views are taken as hereafter described.

Referring to FIGS. 1 and 2, the strip guiding apparatus 10 of the present invention is shown mounted on a tread guide frame 11 of a tire machine servicing apparatus schematically shown at 12. In the embodiment shown, the apparatus 10 is termed a tread guide. As shown in FIGS. 2 and 3, a tread strip support roll 13 and a strip applicator roll 14 is mounted at the end of guide frame 11. In FIG. 1 a hydraulically actuated strip stop assembly 15 is shown which stops a tread strip moved through tread guide 10. The guide frame 11 is equipped to the left of tread guide 10 with conveyor rollers (not shown) which convey rubber tread strips, such as indicated at 19, to tread guide 10. The servicing apparatus 12 is transversely movable along a bearing system such as schematically shown at 16. The guide frame 11 is pivoted about a bearing assembly schematically shown at 17 to move the roller 14 away from and into contact with a drum 18 of a tire building machine which may be of the type disclosed in previously referenced U.S. Pat. No. 3,475,254 to Henley.

Further details of the servicing apparatus are disclosed in the previously referenced copending and commonly assigned U.S. patent applications.

In operation, the tread strip 19 is guided through the tread guide 10 to be stopped by a strip stop 15. At this phase of operation the roller 14 is in a lowered away position from drum 18. The strip stop 15 is actuated to pivot clear of tread strip 19 and the rollers 13 and 14 are raised to place the tread strip 19 into adhesive contact with the carcass of a tire (not shown) on drum 18. After the drum 18 is rotated and the tread strip 19 is precisely applied, the rollers 13 and 14 are lowered and stitching rollers (not shown) are extended from servicing apparatus 12 to stitch the tread strip 19 onto the tire carcass. This cycle as described is repeated for each tire carcass.

FIG. 3 is a somewhat schematic plan view of tread guide 10 showing the support rolls 20, the upper guide rolls 22, the lower guide rolls 24 and the upper pressure rolls 26. FIG. 4 further shows the linear mounting of support rolls 20, upper guide rolls 22 and lower guide rolls 24.

Shown in ghost lines in FIG. 3 and in cross section in FIGS. 5–8 is tire tread strip 19 having on either side a tapered side edge surface 27 terminating in a skived or feathered edge 28 on either side.

In comparing FIGS. 3 and 4 with FIGS. 5–8, it is readily seen that upper guide rollers 22 and lower guide rollers 24 are linearly spaced apart in a regular and symmetrical array with upper guide rollers 22 being positioned alternately with lower guide rollers 24. It is also to be noted that support rollers 20 are positioned on centers linearly offset from the centers of both upper guide rollers 22 and lower guide rollers 24.

The effect of the positions of the guide rollers is that the thin edge 28 of tread strip 19 passes alternately over a lower guide roller 24 then under an upper guide 22 and then over a support roller 20 without opposing support at any roller. Such effect on the flexible tread strip 19 is to urge the thin edges 28 through strip guide 10 in a weaving or sinuous manner with a considerable upper area of the tread strip in contact with guide rollers 22 and the tapered side edge surface 27 of the tread strip in contact with the guide rollers 24.

As will be later described in more detail it can be seen that lower guide rollers 24 are canted inwardly and downwardly with respect to the thin edges 28 of tread strip 19, tending to push tread strip 19 into centered relation between the lower guide rollers 24. The upper guide rollers 22, shown as being canted inwardly and upwardly with respect to the thin edges 28, operate in coordination with lower guide rollers 24 to push tread strip 19 into centered position.

In some embodiments of tread guide 10, either the lower guide rollers 24 or the upper guide rollers 22 only need be canted with the other set of guide rollers disposed horizontally. Such a varied embodiment is disclosed in previously referenced U.S. application Ser. No. 565,036. The embodiment substantially as herein illustrated and described in considered most effective in aligning tread stock such as tread strip 19.

Referring to FIGS. 5–8, it is to be noted that the support rolls 20 and the pressure rolls 26 are mounted on axles between support plates with springs mounted in compression on each axle between the support plates and the rollers 20 and 26. The rolls 20 and 26 are axially movable on their respective mounting axles and can be moved transversely of tread guide 10 as the tread strip 19 is moved transversely into centered position by guide rollers 22 and 24.

The pressure rollers 26 are helpful but not essential depending on the size, weight and contour of the rubber strip to be guided. When pressure rollers 26 are utilized it is desirable, with space permitting, to mount the pressure rollers 26 on axes which are linearly offset with respect to the axes of rollers 20, 22 and 24, as previously noted.

Referring jointly to FIGS. 3, 4, 7 and 8, it is seen that the tread guide 10 is linearly symmetrical along each side of its length and parts with corresponding functions are designated with corresponding numbers.

The tread guide 10 includes at its bottom two support roller plates 30 which are mounted and fastened into the tread guide frame 11 with appropriate fasteners, guides and brackets (not shown). Mounted with each plate 30 is a side plate 32 which is suitably attached to plate 30 as with cap screws, bolts or the like (not shown).

A lower guide roller support plate 34, a lower roller roll plate 36, an upper roller support plate 38, and an upper roller roll plate 40 is mounted on each side of tread guide 10 from two support plate guide rods 42. As shown, the support plates 34 are equipped with guide bushing assemblies 33 which are slidably mounted on guide rods 42 and support plates 38 are equipped with guide bushing assemblies 41 which are slidably mounted on guide rods 42.

Also mounted between plates 32 are two vertically disposed rotatable support plate transverse adjustment rods 44.

The lower support plates 34 are equipped with threaded bushing assemblies 35 threadedly connected to the lower guide rod and the upper roller support plates 38 are equipped with threaded bushing assemblies 39 threadedly connected to the upper guide rod.

The transverse adjustment rods 44 are equipped respectively with right and left hand threads extending to the center of each rod. Rotation of upper adjustment rod 44 will transversely adjust upper roller support plates 38 together or apart, depending on the direction of rotation of the rod, and the lower adjustment rod will transversely adjust lower roller support plates 34 together or apart, depending on the direction of rotation.

As shown in FIGS. 4 and 8, for example, support plate 34 and roll plate 36 are rigidly connected together by threaded cap screw connectors 37.

The lower guide roller assemblies 24 include a shank mounted in keyed and locked relation to a rotatable turn shaft 46, clamped at each end (FIGS. 4 and 8) by clamp assemblies 48. Each turning shaft 46 is supported by intermediate lower guide rollers 24 and clamps 48 by means of support bushings 50 as seen in FIGS. 3 and 4.

As can be seen the lower guide roller assemblies 24 are angularly adjustable by clamps 48 and transversely adjustable through lower adjustment rod 44 with respect to a respective width of tread strip 19 and the shape of the flexible thin edges 28 of strip 19.

Figure 5:
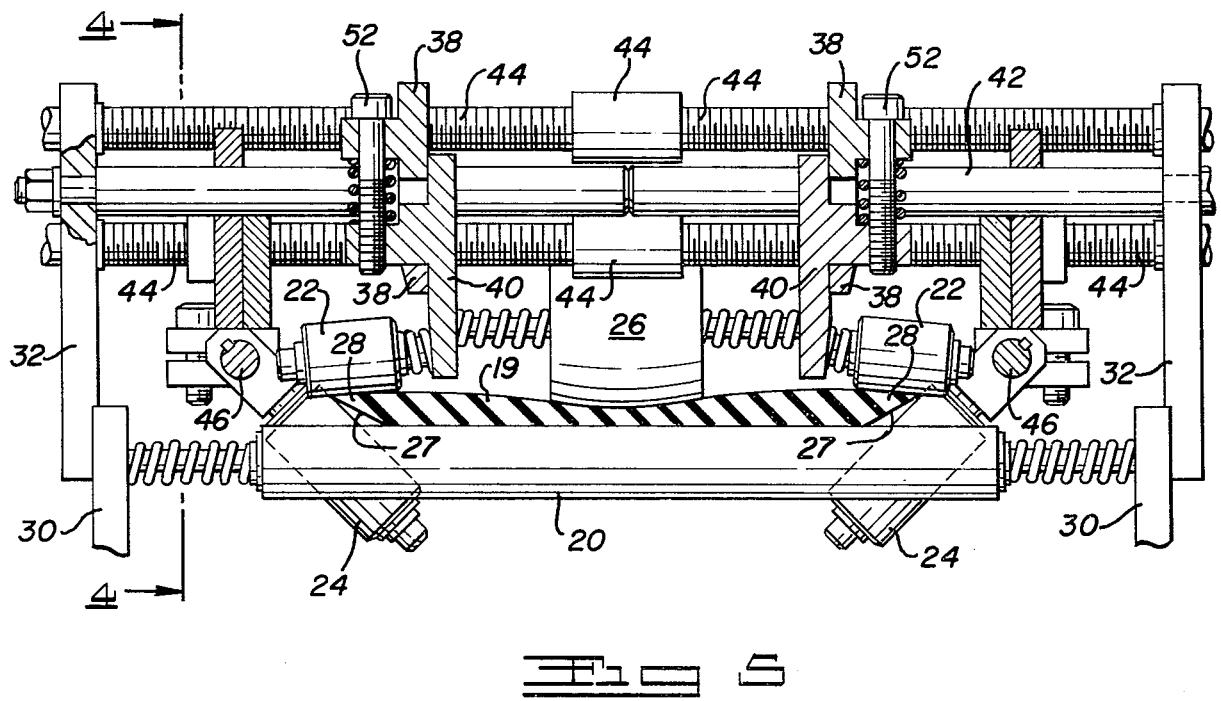
FIG. 5 is a partly sectional view taken along the line 5—5 of FIG. 4 and also showing the line 4—4 of FIG. 3.
Figure 6:
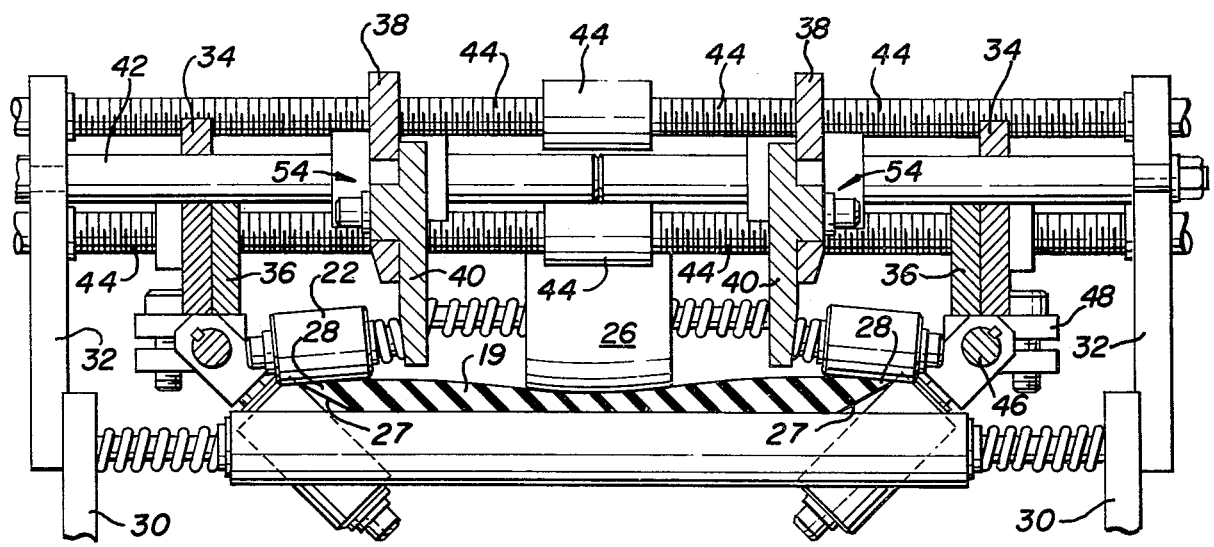
FIG. 6 is a partly sectional view taken along the line 6—6 of FIG. 4.

FIG. 4, 5 and 6 depict the vertical adjustment and action of upper guide rollers 22. Shown in FIGS. 4 and 5 are adjustable key assemblies 52 which adjustably connect support plates 38 with roll plates 40. The downward force on upper guide roll assemblies 22 come from the weight of the roller support plate 40 as may be modified by the compression of springs in key assemblies 52. As shown in FIGS. 4 and 6, the ends of roll plates 40 are connected for free vertical movement by retainer keys 54.

The upper guide roller assemblies 22 are shown mounted to upper roll plate 40 with compressed springs at an angle extending outwardly and downwardly so that the roller extends outwardly and downwardly across the thin edge 28 of tread strip 19. The spring is to allow the roller to move inwardly slightly to follow a corrective centering shift of the tread strip 19. However, the tread guide 10 would be operable if upper guide roller assemblies were mounted horizontally and with no springs, if the lower roller guide assemblies 24 remain canted downwardly toward the center of tread strip 19 as indicated, and vice versa.

Top pressure roller assemblies 26 are spring mounted for transverse movement as are support roller assemblies 20. As shown, roller assemblies 20 are mounted between roll plates 30. Similarly, pressure roller assemblies 26 are mounted between roll support plates 40. Further, the axles of roller assemblies 26 may be mounted in vertical slots (not shown) so that the weight of each roller assembly 26 is the only vertical force exerted by the roller.

In operation of tread guide 10, a tread strip 19 is moved into the guide 10 from the guide frame 11 by conveying means (not shown) of the servicing apparatus 12. As the tread strip 19 moves over the support rollers 20 the thin edges 28 begin to weave between the upper guide rollers 22, the lower guide rollers 24, the support rollers 20 (and the pressure rollers 26 if utilized). The alternate forces applied to the tread strip 19, particularly to the surfaces of the thin edges 28 by alternate lower guide rollers 24 and upper guide rollers 22, urge the tread strip 19 as it passes through strip guide 10, into a centered position between the guide rollers 22 and 24 and thereby into proper alignment to be applied to a tire carcass on drum 18 of a tire machine.

The foregoing description and drawing will suggest other embodiments and variations to those skilled in the art, all of which are intended to be included in the invention as herein set forth.

I claim:

1. Apparatus suitable for guiding into precise alignment with a tire carcass an uncured, deformable semi-plastic rubber strip having at least one tapered side edge surface meeting to form a skived or feathered edge with the upper or lower surface of said strip, examples of said rubber strip being a tire tread strip and a tire sidewall strip, said apparatus comprising:
   a. a plurality of support rollers mounted in axially spaced apart and parallel relation for supporting the lower surface of said rubber strip with each support roller being axially movable and resiliently held in the axial direction by springs mounted in compression at the ends of each support roller;
   b. a plurality of axially spaced first guide rollers mounted linearly offset from said support rollers, said first guide rollers being mounted for rolling engagement with said tapered side edge surface of said rubber strip adjacent said feathered edge and canted inwardly toward the center of said rubber strip;
   c. a plurality of axially spaced second guide rollers mounted linearly offset from the first guide rollers and linearly offset from the support rollers, said second guide rollers being mounted for rolling engagement with said surface of said rubber strip with which said tapered side edge surface meets to form said feathered edge, said second guide rollers being canted inwardly toward the center of said rubber strip;
   d. means for limiting the outward movement of the edge of said rubber strip laterally opposite from said feathered edge;
   e. said support rollers being adapted to move axially to accommodate any transverse movement of said rubber strip;
said linearly offset first and second guide rollers thereby limiting the outward movement of said feathered edge of said rubber strip and combining with said support rollers to channel said feathered edge in a weaving motion between said rollers to properly align said rubber strip for application to said tire carcass.

2. The apparatus of claim 1 wherein said tapered side edge surface extends along the top side of said strip and said first guide rollers mounted for rolling engagement with said tapered side edge surface are vertically adjustable with respect to said support rollers.

3. The apparatus of claim 1 further including a plurality of axially spaced, parallel upper pressure rollers mounted linearly offset from said support rollers and on top and near the center of said rubber strip, each said pressure roller being axially and vertically movable and resiliently held in the axial direction by springs mounted in compression at the ends of each said pressure roller to accommodate any transverse movement in the position of said rubber strip.

4. The apparatus of claim 1 wherein said second guide rollers are held in the axial direction by resilient springs allowing yeildable axial movement of said second guide rollers toward the center of said rubber strip to accommodate any transverse movement of said rubber strip.

5. The apparatus of claim 1 wherein each said first guide roller is angularly adjustable relative to the plane of said support roller to vary the angle of rolling contact with said thin edge of said rubber strip.

6. The apparatus of claim 1 wherein said rubber strip has skived or feathered thin edges on both sides and said first and second guide rollers are mounted on each side of said rubber strip as a pair of lower guide rollers and a pair of upper guide rollers.

7. The apparatus of claim 1 wherein said guide rollers are mounted for transverse adjustment to be capable of accommodating rubber strips of different widths.

8. Apparatus suitable for guiding into precise alignment with a tire carcass an uncured, deformable semi-plastic rubber strip having at least one tapered side edge surface meeting in a skived or feathered edge with the upper or lower surface of said strip, examples of said rubber strip being a tire tread strip and a tire sidewall strip, said apparatus comprising:
   a. a plurality of support rollers mounted in axially spaced apart and parallel relation for supporting the lower surface of said rubber strip with each support roller being axially movable and resiliently held in the axial direction by springs mounted in compression at the ends of each support roller;
   b. a plurality of axially spaced first guide rollers mounted linearly offset from said support rollers, said first guide rollers disposed across said tapered side edge surface of said rubber strip adjacent said feathered edge and in rolling engagement with said side edge surface;
   c. a plurality of axially spaced second guide rollers mounted linearly offset from the first guide rollers and linearly offset from the support rollers, said second guide rollers being disposed across said surface of said rubber strip with which said tapered side edge surface meets to form said feathered edge, said second guide rollers being in rolling engagement with said side of said rubber strip;
   d. means for limiting the outward movement of the edge of said rubber strip laterally opposite from said feathered edge;
   e. said support rollers being adapted to move axially to accommodate any transverse movement of said rubber strip;
said linearly offset first and second guide rollers thereby limiting the outward movement of said feathered edge of said rubber strip and combining with said support rollers to channel said feathered edge in a weaving motion between said rollers to properly align said rubber strip for application to said tire carcass.

9. The apparatus of claim 8 further including a plurality of axially spaced parallel upper pressure rollers mounted linearly offset from said support rollers and on top and near the center of said rubber strip, each said pressure roller being axially and vertically movable and resiliently held in the axial direction by springs mounted in compression at the ends of each said pressure roller to accommodate any transverse movement in the position of said rubber strip.

10. The apparatus of claim 8 wherein said second guide rollers are held in the axial direction by resilient springs allowing yieldable axial movement of said second guide rollers toward the center of said rubber strip to accommodate any transverse movement of said rubber strip.

11. The apparatus of claim 8 wherein each said first guide roller is angularly adjustable relative to the plane of said support rollers to vary the angle of rolling contact with said thin edge of said rubber strip.

12. The apparatus of claim 8 wherein said rubber strip has skived or feathered thin edges on both sides and said first and second guide rollers are mounted on each side of said rubber strip as a pair of lower guide rollers and a pair of upper guide rollers.

13. The apparatus of claim 9 wherein said guide rollers are mounted for transverse adjustment so as to be able to accommodate rubber strips of different widths.

14. The apparatus of claim 8 wherein said second guide rollers are canted inwardly toward the center of said rubber strip to establish an inclined rolling contact with said tapered side edge surface of said rubber strip.

15. The apparatus of claim 11 wherein said rubber strip has skived or feathered thin edges on both sides and first and second guide rollers are mounted on each side of said rubber strip as a pair of lower guide rollers and a pair of upper guide rollers.

16. The apparatus of claim 11 wherein said first and second guide rollers are mounted for transverse adjustment so as to be able to accommodate rubber strips of different widths.

17. The apparatus of claim 11 wherein said second guide rollers are canted inwardly toward the center of said rubber strip to establish an inclined rolling contact with said tapered side edge surface of said rubber strip.

18. The apparatus of claim 11 further including a plurality of axially spaced upper pressure rollers mounted linearly offset from said support rollers and on top and near the center of said rubber strip, each said pressure roller being axially and vertically movable and resiliently held in the axial direction by springs mounted in compression at the ends of each said pressure roller to accommodate any transverse movement in the position of said rubber strip.

19. The apparatus of claim 17 wherein said second guide rollers are held in the axial direction by resilient springs allowing yieldable axial movement of said second guide rollers toward the center of said rubber strip to accommodate transverse movement of said rubber strip.

20. The apparatus of claim 18 wherein said tapered side edge surface extends along the top side of said strip and said first guide rollers mounted for rolling engagement with said tapered side edge surface are vertically adjustable with respect to said support rollers.

21. The apparatus of claim 11 wherein said tapered side edge surface extends along the top side of said strip and said first guide rollers mounted for rolling engagement with said tapered side edge surface are vertically adjustable with respect to said support rollers.

* * * * *

UNITED STATES PATENT AND TRADEMARK OFFICE
CERTIFICATE OF CORRECTION

PATENT NO. : 4,049,486
DATED : September 20, 1977
INVENTOR(S) : Virgil E. Henley It is certified that error appears in the above-identified patent and that said Letters Patent are hereby corrected as shown below:

Column 8, line 33, after "axially spaced", insert --parallel--

Signed and Sealed this

Twentieth Day of December 1977

[SEAL]

Attest:

RUTH C. MASON
Attesting Officer

LUTRELLE F. PARKER
Acting Commissioner of Patents and Trademarks